United States Patent [19]

f'Geppert

[11] Patent Number: 4,655,619
[45] Date of Patent: Apr. 7, 1987

[54] TAPERED ROLLER BEARING

[75] Inventor: Erwin f'Geppert, Oakland County, Mich.

[73] Assignee: The United States of America as represented by the Secretary of the Army, Washington, D.C.

[21] Appl. No.: 277,477

[22] Filed: Jun. 26, 1981

[51] Int. Cl.⁴ ............................................. F16C 33/34
[52] U.S. Cl. ....................................................... 384/567
[58] Field of Search ............ 308/215, 214, 202, 184 R, 308/207 R, 26; 384/450, 548, 565, 567, 568, 619

[56] References Cited

U.S. PATENT DOCUMENTS

| | | | |
|---|---|---|---|
| 2,417,398 | 3/1947 | Rundt | 308/214 |
| 2,631,904 | 3/1953 | Frenkel | 308/214 |
| 3,989,326 | 11/1976 | Hörmann | 308/214 X |
| 4,232,914 | 11/1980 | Bowen | 308/214 X |

Primary Examiner—Stuart S. Levy
Assistant Examiner—David Werner
Attorney, Agent, or Firm—Peter A. Taucher; John E. McRae; Robert P. Gibson

[57] ABSTRACT

A resilient hollow annular frustro-conical roller bearing whose wall thickness varies according to the roller diameter. Any abnormal load placed upon the roller causes an increase area of contact between the roller and the opposing race surfaces. The hollow annular construction of the bearing is such that the load causes the roller to be stressed substantially uniformly along its entire length.

1 Claim, 4 Drawing Figures

4,655,619

TAPERED ROLLER BEARING

GOVERNMENT INTEREST

The invention described herein may be manufactured, used, and licensed by or for the Government for governmental purposes without payment to me of any royalty thereon.

BACKGROUND AND SUMMARY OF THE INVENTION

The object of this invention is to provide a resilient frustoconical roller of hollow annular construction whose wall thickness varies according to the roller diameter whereby abnormal loads cause the roller to be deflected substantially uniformly along its entire length, thereby avoiding stress concentrations that can lead to premature failure.

U.S. Pat. No. 3,445,146 issued to Alexandre et al describes roller or spherical type bearings which are made of resilient materials and which may deflect under load without permanent deformation. The idea involves loading the bearings so that the load is evenly distributed to the entire bearing surfaces.

The present disclosure differs from Alexander et al U.S. Pat. No. 3,445,146 in that it relies upon hollow frusto-conical bearings to resist permanent deformation during loading. The hollow bearings have a greater resiliency than solid bearings under load. I design each hollow frusto-conical bearing with a variable wall thickness related to the diameter difference between the small end of the bearing and the large end, whereby the bearing undergoes deflection along its entire length, thus avoiding potential stress concentrations.

Buckwalter U.S. Pat. No. 1,961,134 describes a conical anti-friction roller bearing that apparently flattens under very heavy loads; the roller is presumably a solid element. Buckwalter makes no special provisions for deformation of the bearing when subjected to increased loads. As a result, if the bearings are deformed during loading, the efficiency of the Buckwalter device may be impaired. The present invention overcomes this shortcoming by providing hollow bearings which are sufficiently resilient to absorb shock loads by temporarily deforming and then returning to normal when the load is reduced to normal.

U.S. Pat. No. 3,301,611 to Dunlap discloses in FIG. 8 thereof an anti-friction bearing comprising a series of hollow cylindrical elements capable of deforming under high loads. Apparently the wall thickness of each cylindrical element is uniform along the element length. My bearing design differs from Dunlap in that it involves hollow frusto-conical elements of progressively changing wall thickness from one end of each element to the other, whereby the array of bearing elements is able to withstand high shock loadings in both radial and axial (thrust) directions.

THE DRAWINGS

Figure 3:
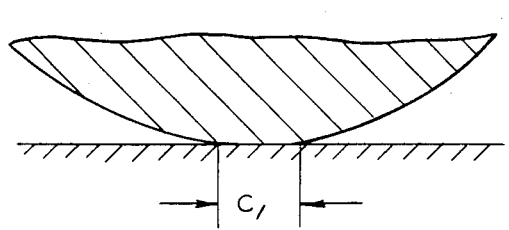
Figure 4:
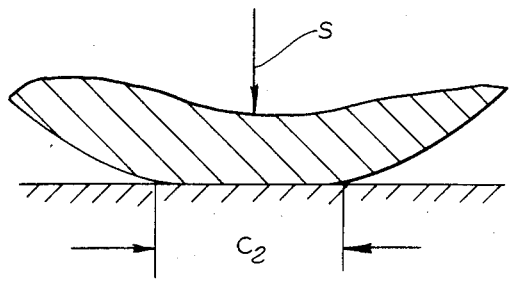

FIGS. 3 and 4 schematically illustrate roller deflection action that occurs during bearing operation under high shock loadings.

Figure 1:
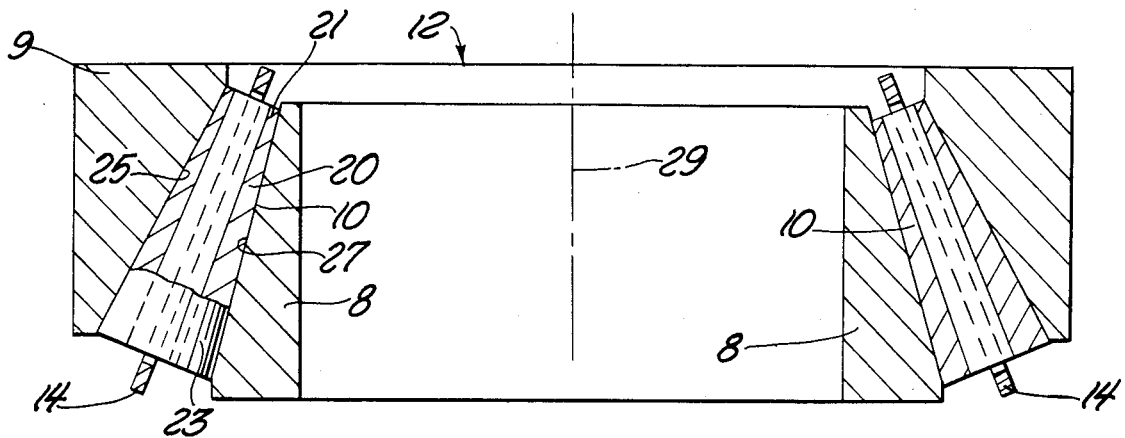
FIG. 1 is a sectional view taken through an anti-friction bearing assembly embodying my invention.

FIG. 1 is a cross sectional view of a tapered roller bearing embodying my invention, comprised of an inner race 8, an outer race 9, and an array of frustro-conical rollers 10 therebetween. A spacer 14 maintains the rollers in evenly spaced relation. It will be noted that each roller 10 is of hollow construction, and that wall 20 of the roller is not of uniform thickness along the roller element length. Rather, wall 20 is relatively thin at the small end 21 of the frusto-conical roller bearing and becomes progressively thicker toward the large end 23 of the frusto-conical roller.

It is known that a large diameter hollow element has greater resiliency under radial loads than a small diameter element. Resilient deflection varies according to the cube of the diameter of the element. The roller shown in attached FIGS. 1 and 2 has a wall thickness that varies along the roller length in accordance with the cube of the diameter. For example, assuming that the large end of the roller is twice the diameter of the small end, then the wall thickness at the large end will be eight times that of the small end.

The principal object of this invention is to provide a bearing which will be stressed substantially uniformly during abnormal or shock loadings. By varying the wall thickness according to the roller diameter, the shock stress will be distributed substantially uniformly along the entire roller length, without stress concentration, permanent deformation or fracture.

FIGS. 3 and 4 show in exaggerated fashion the transverse cross section of a circular bearing, particularly the deformation experienced by the roller during application of shock loading S to the roller-race interface. Prior to the shock load the area of contact $C_1$ is relatively small. When abnormally large force S is transmitted to the bearing, the bearing assumes the configuration of FIG. 4 wherein the area of contact $C_2$ with the opposing race surface is substantially greater than the initial area of contact $C_1$. This increased contact surface area distributes the increased shock load so that a given total loading translates into the same or lesser p.s.i. unit loading, compared to normal conditions represented by FIG. 3. The actual change in the roller contact area is much less than depicted in FIGS. 3 and 4, but the ratio of $C_1$ to $C_2$ may be approximately as shown, depending on the selected roller wall thickness.

Figure 2:
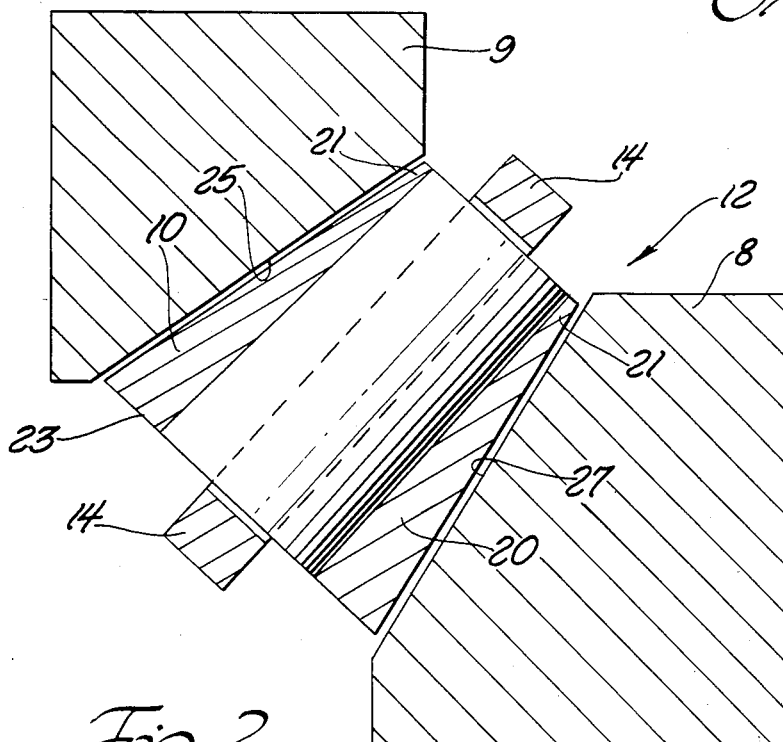
FIG. 2 is an enlarged sectional view of a hollow frustro-conical bearing element and cooperating races embodying my invention.

The frustro-conical rollers shown in FIGS. 1 and 2 absorb both radial and axial loads. During the application of high shock loads in the axial and/or radial directions race surface 25 moves a very slight distance toward race surface 27. Surfaces 25 and 27 are conical surfaces centered at a common point on the bearing axis 29, as is conventional for tapered roller bearings. My invention relates to variable wall thickness roller design for improving the shock load capacity of tapered roller bearings. By varying the roller wall thickness according to the cube of the roller diameter the roller will deflect substantially evenly along the roller length so that each increment of the bearing length will continue to bear its share of the load. The absolute average wall thickness of the roller is selected so that the roller undergoes significant deflection only at high shock loads greater than average steady state values. Under normal loads the bearing performs like a conventional tapered roller bearing.

I wish it to be understood that I do not desire to be limited to the exact details of construction shown and described for obvious modifications will occur to a person skilled in the art.

I claim:

1. In a tapered roller bearing comprising an inner race having a conical bearing surface centered on a central point along the bearing axis, an outer race having a conical bearing surface centered on that same central point, and an array of frustoconical rollers interposed between the inner and outer races: the improvement wherein each roller is hollow along its entire length; the wall thickness of each roller being relatively small at the small end of the roller and being relatively large at the large end of the roller, so that each roller will be stressed substantially uniformly along its entire length during shock loading and resume its ordinary configuration during normal loading, thereby protecting against permenent deformation and fracture; the wall thickness of each roller becoming progressively greater from the small end of the roller to the large end; the change in wall thickness along the roller length being uniform; the roller wall thickness varying according to the cube of the roller diameter.

* * * * *